M. VAN VRANKEN.
Gas Stove.
No. 62,707.
Patented March 5, 1867.
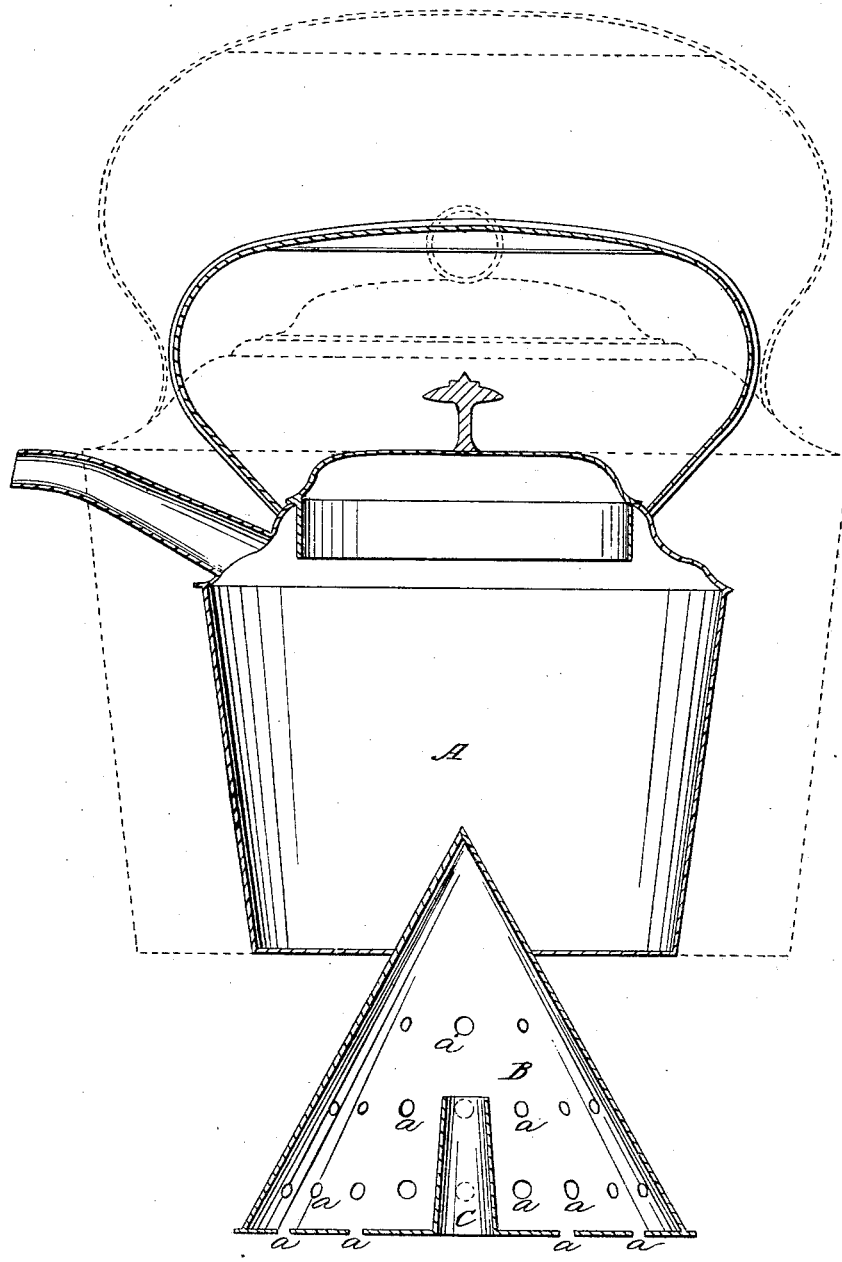

United States Patent Office.

MARY VAN VRANKEN, OF WASHINGTON, DISTRICT OF COLUMBIA.

Letters Patent No. 62,707, dated March 5, 1867.

ATTACHMENT FOR HEATING KETTLES AND BOILERS BY GAS.

*The Schedule referred to in these Letters Patent and making part of the same.*

TO ALL WHOM IT MAY CONCERN:

Be it known that I, MARY VAN VRANKEN, of Washington, county of Washington, District of Columbia, have invented a new and useful Improvement in Gas Boilers or Kettles; and I do hereby declare that the following is a full, clear, and exact description of the construction and operation of the same, reference being had to the annexed drawing, making a part of this specification, in which—

Figure 1 is a sectional elevation of a boiler or kettle, representing my improvement applied thereto.

The invention consists in the application to the bottom of a kettle or other boiler of a perforated conical stand, or its equivalent, provided with a central tube or ring adapted to fit over an ordinary gas burner in such manner as to afford a ready and convenient means for heating water, &c., as hereinafter explained.

To enable others to construct and use said invention, I will describe the same with reference to the drawing.

A represents a kettle or boiler, which may be of any ordinary construction, and B is a perforated cone or stand, connected to the bottom of the kettle or boiler by soldering or otherwise, in such manner as to firmly connect it to the boiler. C is an opening, ring, or tube, in the base of the stand, of proper diameter to fit over an ordinary gas burner, and of a construction adapted to maintain the cone or stand, with the kettle or boiler mounted upon it, in a vertical or nearly vertical position, supported by the burner to which it is applied. *a a* are perforations in the bottom and sides of the stand B for the admission of air and the escape of the gas.

The operation is as follows: The desired quantity of water being poured in the boiler, the boiler is adjusted upon a gas burner by means of the tube or aperture C, in the stand B. The gas is then turned on and permitted to escape through the numerous perforations in the stand, and is ignited upon the upper and outer sides thereof, and the heat or fire is thus distributed over the entire bottom surface of the boiler, or over so much thereof as corresponds with the size of the stand to which it is applied. (See red lines in drawing.)

I have described above one practical way for carrying out the invention, but it will be obvious that numerous changes may be made in the form and construction of the devices employed; for example, the stand is not necessarily conical in form, though that is a convenient, practical, and economical form; and instead of being made of tin and perforated, said stand may be made of wire gauze. By the construction shown and described, I provide a convenient and ready means for heating water in small quantities, which is at all times prepared for use, and am enabled to dispense with the more expensive gas stoves heretofore used.

What I claim as my invention is—

A perforated stand, attached to the bottom of a kettle or boiler, and adapted to be used upon an ordinary gas burner, substantially as and for the purpose specified.

In testimony whereof I have hereunto set my hand this seventh day of February, 1867.

MARY VAN VRANKEN.

Witnesses:
ELLEN P. FISHER,
MARIE E. CLAPHAM.